US009064439B2

(12) United States Patent
Aso

(10) Patent No.: US 9,064,439 B2
(45) Date of Patent: Jun. 23, 2015

(54) DISPLAY CONTROL APPARATUS, DISPLAY CONTROL METHOD, AND COMPUTER PROGRAM PRODUCT

(75) Inventor: Yuuichiro Aso, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 664 days.

(21) Appl. No.: 13/416,253

(22) Filed: Mar. 9, 2012

(65) Prior Publication Data

US 2012/0320037 A1     Dec. 20, 2012

(30) Foreign Application Priority Data

Jun. 17, 2011  (JP) ................................. 2011-135582

(51) Int. Cl.
| G09G 5/00 | (2006.01) |
| G09G 3/00 | (2006.01) |
| H04N 13/04 | (2006.01) |
| G09G 5/08 | (2006.01) |
| G09G 5/14 | (2006.01) |

(52) U.S. Cl.
CPC ........... *G09G 3/003* (2013.01); *H04N 13/0404* (2013.01); *H04N 13/0409* (2013.01); *H04N 13/0452* (2013.01); *H04N 13/0497* (2013.01); *G09G 5/08* (2013.01); *G09G 5/14* (2013.01)

(58) Field of Classification Search
CPC .............................. G06F 3/04812; G09G 5/00
USPC ........................................................ 715/858
See application file for complete search history.

(56) References Cited

U.S. PATENT DOCUMENTS

| 6,084,589 | A  | 7/2000 | Shima |
| 2008/0034330 | A1 | 2/2008 | Kurita |

FOREIGN PATENT DOCUMENTS

| JP | 04-243411 | 8/1992 |
| JP | H 1074267 | 3/1998 |
| JP | 10-134069 | 5/1998 |
| JP | 10-164069 | 5/1998 |
| JP | H 10232665 | 9/1998 |
| JP | 2001-352564 | 12/2001 |
| JP | 2004-354540 | 12/2004 |
| JP | 2004354540 A | * 12/2004 |
| JP | 2007-026265 | 2/2007 |
| JP | 2008-040826 | 2/2008 |
| JP | 4222875 | 11/2008 |
| JP | 2009-223532 | 10/2009 |
| JP | 2012-044547 | 3/2012 |

OTHER PUBLICATIONS

Japanese Patent Application No. 2012-233029, Notice of Rejection, mailed Jul. 2, 2013, (with English Translation).

(Continued)

*Primary Examiner* — Sath V Perungavoor
*Assistant Examiner* — Jeffery Williams
(74) *Attorney, Agent, or Firm* — Blakely Sokoloff Taylor & Zafman LLP

(57) ABSTRACT

According to one embodiment, a display control apparatus includes: a display controller configured to control display of stereoscopic display data that is based on pieces of image information which have a mutual parallax and an operation object that moves in accordance with a user's operation, in a screen; and a switch module configured to disable display of the operation object if the operation object moves to an area where the stereoscopic display data is displayed in the screen.

8 Claims, 8 Drawing Sheets

(56) References Cited

OTHER PUBLICATIONS

Japanese Patent Application No. 2011-135582, Decision to Grant a Patent, mailed Oct. 2, 2012, (with English Translation).

Japanese Patent Application No. 2011-135582, Notice of Rejection, mailed Jun. 26, 2012, (with English Translation).

Naoki Koga, "Basic knowledge of UI designing", first edition, Gijutsu-Hyoron Co., Ltd., May 25, 2010, 79-81.

* cited by examiner

DISPLAY CONTROL APPARATUS, DISPLAY CONTROL METHOD, AND COMPUTER PROGRAM PRODUCT

CROSS-REFERENCE TO RELATED APPLICATIONS

This application is based upon and claims the benefit of priority from Japanese Patent Application No. 2011-135582, filed Jun. 17, 2011, the entire contents of which are incorporated herein by reference.

FIELD

Embodiments described herein relate generally to a display control apparatus, a display control method, and a computer program product.

BACKGROUND

Conventionally, there is a stereoscopic image display apparatus capable of displaying an image in three dimensions, which is called a three-dimensional display. Furthermore, in recent years, there is a trend to mount a three-dimensional display to personal computers (PCs).

The three-dimensional display realizes the right-left parallax (horizontal parallax) by using, for example, a slit or a lenticular sheet (a cylindrical lens array). The three-dimensional display with such a configuration provides a right-eye image and a left-eye image to the user's eyes, respectively, thereby realizing stereoscopic display. Naturally, it is necessary to perform a process associated with the three-dimensional display on image data if the stereoscopic display is realized by the three-dimensional display.

Meanwhile, an operation object such as a cursor used for operations using input devices or the like is displayed on display screens of conventional PCs. Besides, various types of movement control, such as cursor jump, have been proposed that are executed in the PCs in accordance with contents displayed on the display screens. Therefore, the operability of the PCs is improved.

However, in the conventional technology, a special process for enabling the stereoscopic display is performed in an area where a stereoscopic image is displayed by the three-dimensional display. Therefore, it is difficult to display an operation object such as a cursor as it is, as a normal two-dimensional image, without any processes in the area where the stereoscopic display is performed.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a display control apparatus comprises a display controller and a switch. The display controller is configured to control display of stereoscopic display data that is based on pieces of image information which have a mutual parallax and an operation object that moves in accordance with a user's operation, in a screen. The switch is configured to disable display of the operation object if the operation object moves to an area where the stereoscopic display data is displayed in the screen.

Figure 1:
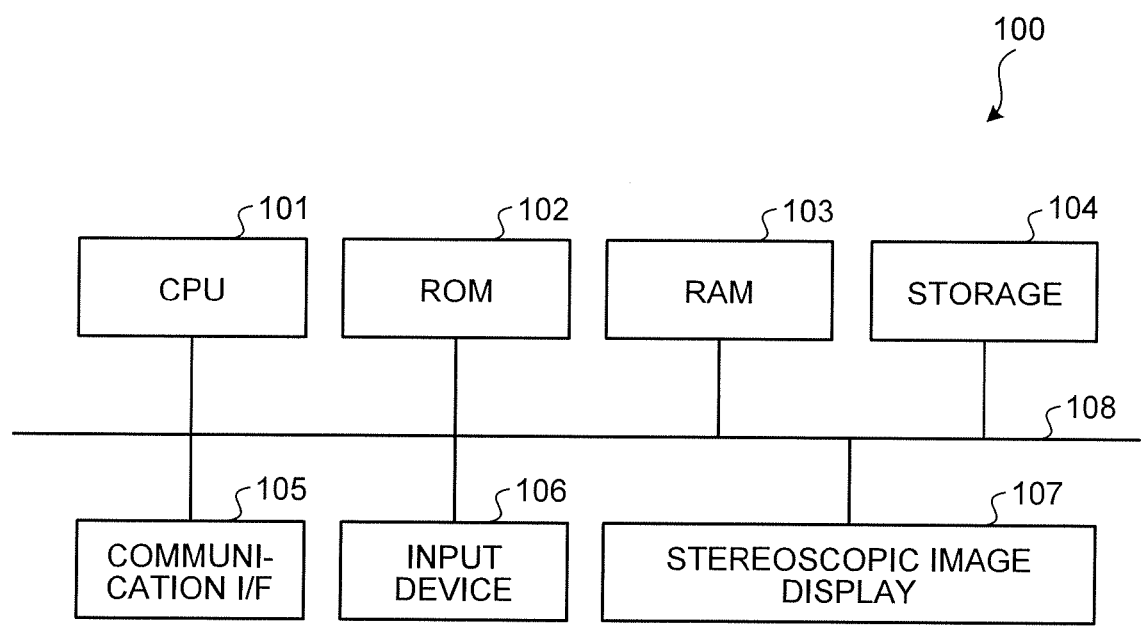
FIG. 1 is an exemplary diagram of a hardware configuration of a stereoscopic image display apparatus according to an embodiment.

A hardware configuration of a stereoscopic image display apparatus according to an embodiment will be described. FIG. 1 is a diagram of an example of the hardware configuration of a stereoscopic image display apparatus 100 in the embodiment. As illustrated in FIG. 1, the stereoscopic image display apparatus 100 comprises a central processing unit (CPU) 101, a read-only memory (ROM) 102, a random access memory (RAM) 103, a storage 104, a communication I/F 105, an input device 106, and a stereoscopic image display 107. They are connected to one another by a bus 108 and have a hardware configuration using a regular computer.

The ROM 102 stores therein various programs executed by the CPU 101, various types of setting information, and the like. The RAM 103 is a main storage device of the stereoscopic image display apparatus 100 and serves as a working area of the CPU 101.

The communication I/F 105 controls data communication with other image processing apparatuses or the like via a LAN, the Internet, etc.

The storage 104 is an auxiliary storage device, such as a hard disk drive (HDD) or a solid state drive (SSD), and stores therein various programs (a stereoscopic cursor control program) executed by the CPU 101 and various types of setting information. The storage 104 also stores therein contents for which parallax images to be described later can be generated.

The input device 106 is a device for operating a cursor displayed on the stereoscopic image display 107. In the embodiment, an example is explained in which the cursor is operated; however, any operation object other than the cursor may be operated.

The stereoscopic image display 107 is an integral imaging (II) or integral photography (IP) stereoscopic image display device capable of displaying a stereoscopic image.

Therefore, the stereoscopic image display apparatus 100 of the embodiment is a PC or the like equipped with an integral imaging (II) or integral photography (IP) glasses-free 3D panel as the stereoscopic image display 107.

Figure 2:
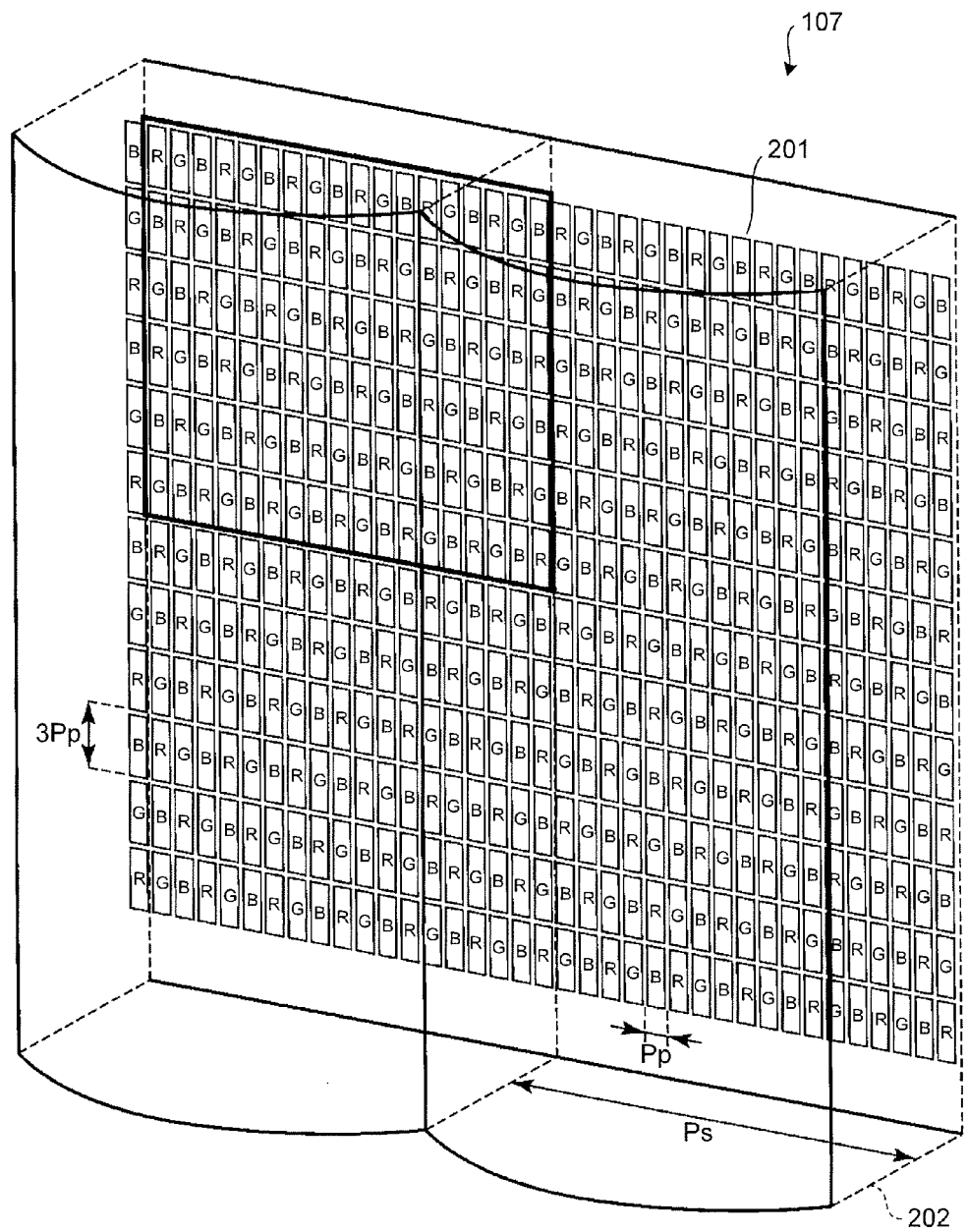
FIG. 2 is an exemplary partially-enlarged perspective view of a configuration of a stereoscopic image display in the embodiment.

FIG. 2 is a partially-enlarged perspective view of a configuration of the stereoscopic image display 107. As illustrated in FIG. 2, the stereoscopic image display 107 comprises an image display element 201 that is composed of a plurality of color pixel dots arranged in a two-dimensional plane and that is capable of displaying color images, and a light-ray-direction limiting element 202 that limits the directions of light rays emitted from the color pixels dots to thereby limit a horizontal viewing angle.

The image display element 201 is preferably what is called a flat panel, in which pixel dots are arranged in a two-dimensional matrix, rather than a CRT or a projector, because light-ray emission directions are largely influenced by positional deviation of the color pixel dots in a screen. Examples of such display systems include a non-luminescence liquid crystal panel (LCD), a luminescence plasma display panel (PDP), and an organic electroluminescence (EL) panel.

The light-ray-direction limiting element 202 is a vertical lenticular lens with a generatrix perpendicular to a vertical direction of the screen. The light-ray-direction limiting element 202 has a function of limiting light-ray output directions and is also called a parallax barrier. The technique for realizing stereopsis is not limited to using the vertical lenticular lens; alternatively, any technique capable of limiting the light-ray output directions is applicable. With such a technique, it is possible to output different light rays to the user's left and right eyes, respectively, enabling to realize stereopsis.

In the image display element 201, pixels each having an aspect ratio of 3:1 are linearly arranged both in the horizontal and vertical directions in a matrix form. The pixels are alternately arranged in order of red (R), green (G), and blue (B) in each row and in order of red (R), blue (B), and green (G) in each column. A vertical pixel pitch is three times greater than a horizontal pixel pitch Pp. The image display element 201 with the above configuration can realize stereoscopic display that gives a plurality of parallaxes in the horizontal direction.

Referring back to FIG. 1, the CPU 101 loads a program stored in the ROM 102 or the storage 104 into the RAM 103 and executes the program. The CPU 101 of the embodiment executes various arithmetic processes in accordance with the stereoscopic cursor control program and controls the modules.

Figure 3:
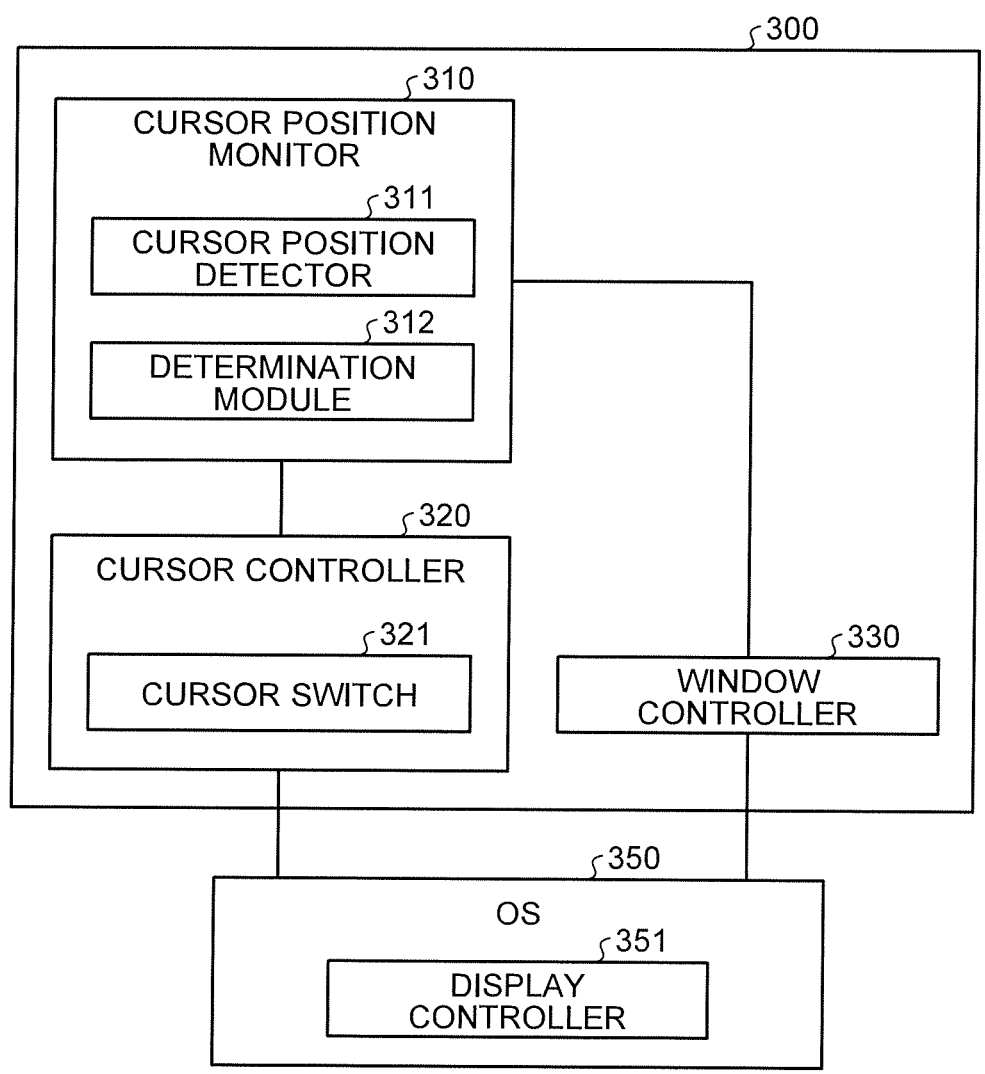
FIG. 3 is an exemplary block diagram of software configurations of a stereoscopic cursor control program and an OS that are executed by a CPU in the embodiment.

FIG. 3 is a block diagram of software configurations of a stereoscopic cursor control program 300 and an OS 350 that are executed by the CPU 101.

The OS 350 is a program that comprises a display controller 351 and that manages hardware and software of a computer. The OS 350 performs program activation, information read control, storage control, and the like. In the embodiment, an example is explained in which the stereoscopic cursor control program 300 runs on the OS 350.

The display controller 351 controls display of various types of information by using the stereoscopic image display 107. The display controller 351 reads a content stored in the storage 104 and sends the content to the stereoscopic image display 107. The content may be any display data, such as moving image data or still image data.

The stereoscopic cursor control program 300 need not necessarily run on a predetermined OS, such as the OS 350; alternatively, it may cause the OS to execute part of various processes to be described later or may be stored as part of a group of program files that constitutes predetermined application software or OS.

The format (3D format) of the content may be any format that gives a mutual parallax or multiple parallaxes and that can be displayed by the stereoscopic image display apparatus 100. Examples of such format include multicast format, side-by-side format, top-and-bottom format, 2D-plus-depth format, and tile format.

Figure 4:
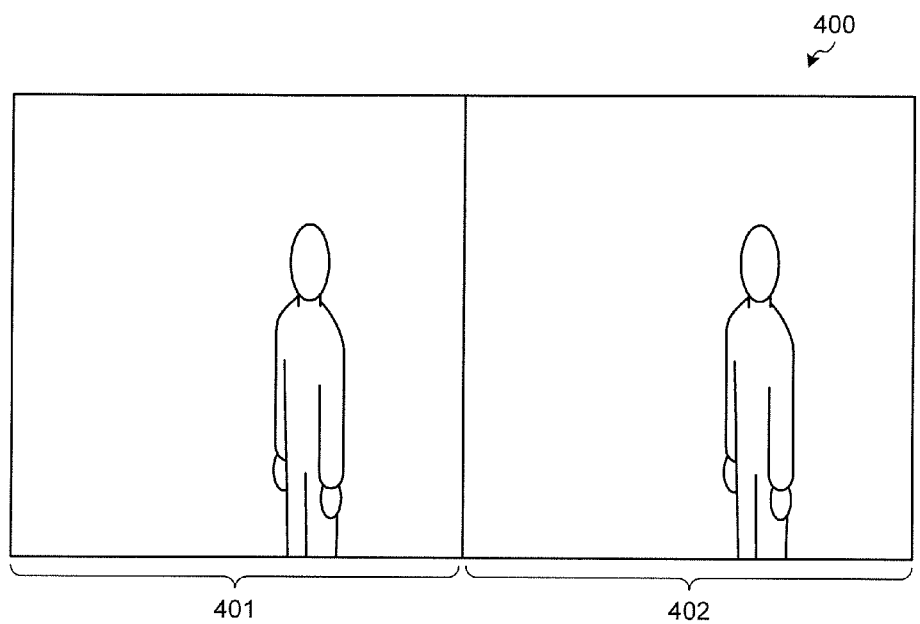
FIG. 4 is an exemplary diagram illustrating image data of one frame of a content in side-by-side format.

FIG. 4 is a diagram illustrating an example of image data of one frame of a content in the side-by-side format. As illustrated in FIG. 4, in the side-by-side format, a right-eye frame 401 and a left-eye frame 402 that have a mutual parallax are compressed by ½ in the horizontal direction and arranged side by side to form one frame image 400.

If a content is stereoscopically displayed, the display controller 351 makes a setting on the stereoscopic image display 107 so that an area where the content is to be displayed can be stereoscopically displayed. After making the setting, the display controller 351 displays the content in the area where the setting of the stereoscopic display is made in the stereoscopic image display 107.

The content is subjected to a process that makes the content be compliant with the stereoscopic display before being output to the area where the stereoscopic display is enabled in the stereoscopic image display 107. The process for the stereoscopic display may be built in the OS 350 as an API or may be realized as a content processing program that runs on the OS 350.

In this way, the stereoscopic image display apparatus 100 of the embodiment can switch between normal two-dimensional display (2D display) and stereoscopic display (3D display) in any area according to whether the display controller 351 makes the setting of the stereoscopic display for each area. For example, the stereoscopic image display apparatus 100 can realize the stereoscopic display within only a window that displays a stereoscopically-displayable content. Therefore, the stereoscopic image display apparatus 100 can simultaneously realize the two-dimensional display and the three-dimensional display.

Figure 5:
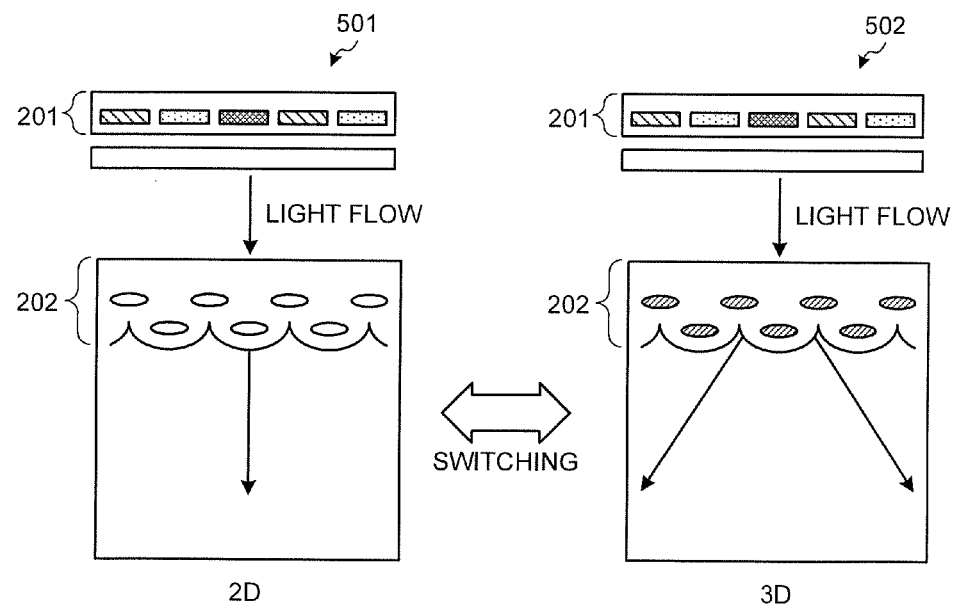
FIG. 5 is an exemplary diagram for explaining switching control between two-dimensional display and stereoscopic display by a display controller in the embodiment.

FIG. 5 is a diagram for explaining switching control between two-dimensional display 501 and stereoscopic display 502. As illustrated in FIG. 5, the display controller 351 can switch between the two-dimensional display 501 and the stereoscopic display 502 by controlling the light-ray-direction limiting element 202 of the stereoscopic image display 107.

In the embodiment, the display controller 351 prevents polarization of light caused by the light-ray-direction limiting element 202. The light output from the image display element 201 passes through the light-ray-direction limiting element 202 as it is, so that the two-dimensional display 501 is realized. On the other hand, the display controller 351 causes polarization of light by the light-ray-direction limiting element 202. Accordingly, the light output from the image display element 201 is separated into right-eye light and left-eye light by the light-ray-direction limiting element 202, so that the stereoscopic display 502 is realized.

Meanwhile, the display controller 351 also displays a cursor of two-dimensional display data or the like that moves in accordance with user operation, on the stereoscopic image display 107, in addition to the stereoscopic display.

Conventionally, if the cursor is displayed in an area where the stereoscopic display is performed, it is necessary to make the cursor be compliant with the stereoscopic display. If the cursor is not compliant with the stereoscopic display, the cursor cannot be displayed at a correct position in the area where the stereoscopic display is performed; therefore, the convenience is reduced. Besides, to make the cursor be compliant with the stereoscopic display, it is necessary to perform a process for the stereoscopic display in accordance with movement of the cursor, resulting in increased process load. To address the above issues, the stereoscopic image display apparatus 100 of the embodiment is configured so that it becomes not necessary to perform a process for the stereoscopic display on the cursor and it becomes possible to maintain the convenience even with the two-dimensional display.

Referring back to FIG. 3, the stereoscopic cursor control program 300 comprises a cursor position monitor 310, a cursor controller 320, and a window controller 330.

The cursor position monitor 310 comprises a cursor position detector 311 and a determination module 312, and monitors movement and a position of a cursor operated by the input device 106, a window dragged by the cursor, or the like. The cursor position monitor 310 keeps notifying the cursor controller 320 and the window controller 330 of a monitoring result.

The cursor position detector 311 detects a position coordinate of the cursor on a screen displayed by the stereoscopic image display 107.

The determination module 312 determines whether the cursor moves to an area where the stereoscopic display is performed on the display screen of the stereoscopic image display 107. The determination module 312 of the embodiment performs the determination based on whether the position coordinate detected by the cursor position detector 311 is contained in the area where the stereoscopic display is performed. The determination module 312 also determines whether a display object (e.g., other windows or icons) dragged by the cursor is contained in the area where the stereoscopic display is performed.

The cursor controller 320 comprises a cursor switch 321 and gives an instruction on display of the cursor, non-display of the cursor, specification of a display position of the cursor, and the like to the OS 350.

If the determination module 312 determines that the cursor has moved to the area where the stereoscopic display is performed, the cursor switch 321 instructs the OS 350 to hide or disable display of the cursor. Furthermore, after a predetermined time has elapsed since the movement of the cursor is stopped, the cursor switch 321 instructs the display controller 351 of the OS 350 to re-display the cursor in an area where an item that is operable by the cursor is arranged in the display screen.

Accordingly, the display controller 351 displays the cursor in the area where the item that is operable by the cursor is arranged. The predetermined time may be, for example, two or three seconds. Alternatively, any appropriate time can be set depending on embodiments. It is assumed that a display destination where the cursor is to be displayed is a title bar or a control bar, on which an item that is operable by the cursor is arranged.

The display controller 351 need not necessarily re-display the cursor on the title bar or the control bar after the predetermined time has elapsed since the hidden cursor is stopped; alternatively, the cursor may be re-displayed after a predetermined time has elapsed since the cursor is hidden.

Figure 6:
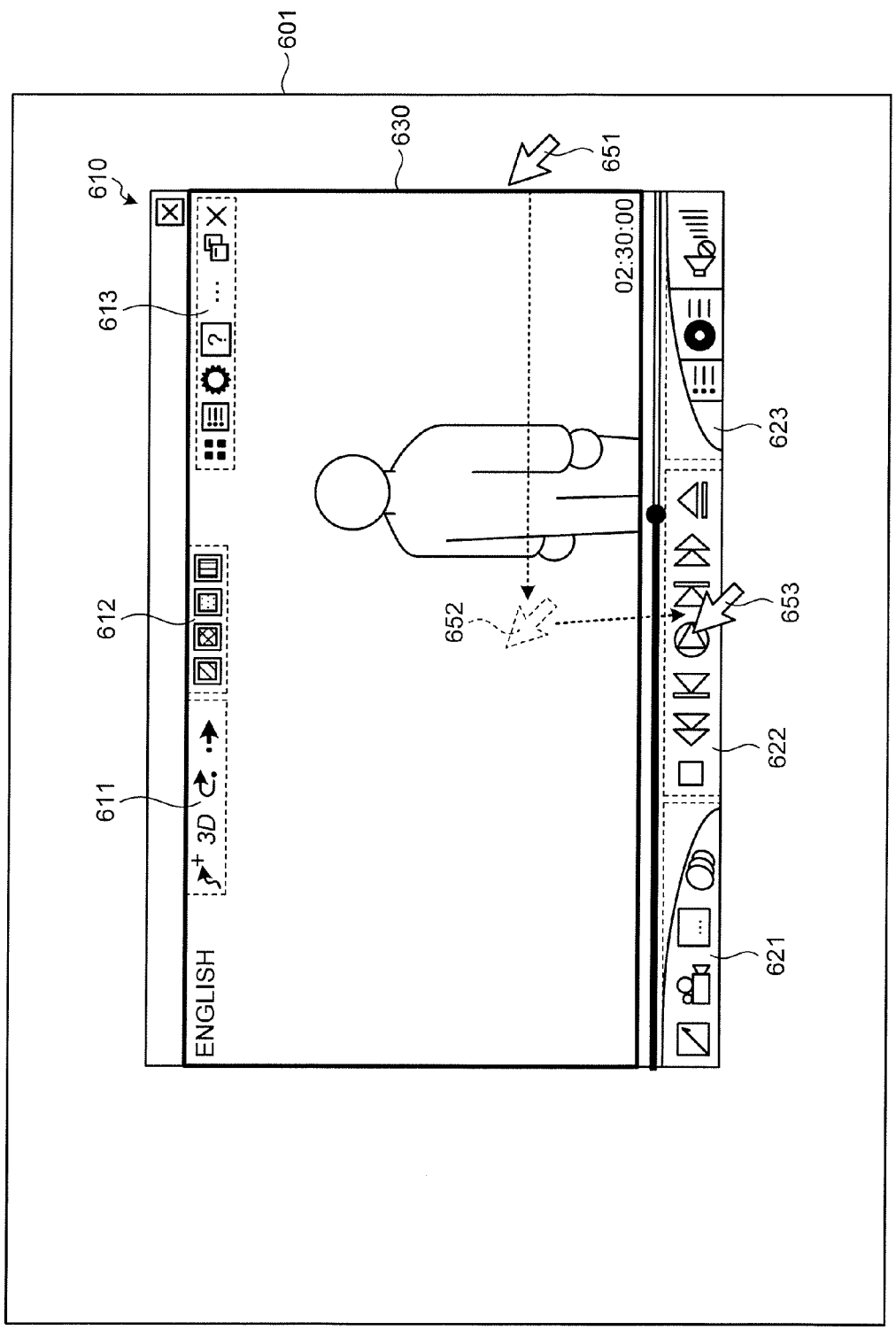
FIG. 6 is an exemplary diagram illustrating a display screen displayed by the display controller in the embodiment.

FIG. 6 is a diagram illustrating an example of a display screen displayed by the display controller 351. A display screen 601 illustrated in FIG. 6 contains a window 610. The window 610 displays thereon title bars 611, 612, and 613 and control bars 621, 622, and 623. Each of the title bars 611, 612, and 613 and the control bars 621, 622, and 623 contains items that are operable by the cursor and is displayed two-dimensionally.

A content in the side-by-side format described above is displayed in an area 630 in the window 610 after being subjected to a process for making the content be compliant with stereoscopic display. Therefore, if a normal cursor 651 is contained in the area 630, the position of the cursor 651 is not accurately displayed.

If the determination module 312 determines that the cursor is contained in the area 630, the cursor switch 321 instructs the display controller 351 to hide the cursor. Accordingly, the cursor is not displayed. In the embodiment, if a predetermined time has elapsed since movement of a cursor 652 is stopped in the area 630, the cursor controller 320 instructs the display controller 351 to display the cursor on any of the title bars 611, 612, and 613 and the control bars 621, 622, and 623, in accordance with the position coordinate of the stopped cursor.

In the example illustrated in FIG. 6, the display controller 351 re-displays a cursor 653 on the control bar 622 according to the position coordinate of the cursor 652. In this way, the cursor is caused to jump so as to be displayed in an area where the two-dimensional display is enabled and where the operable items are arranged, so that the operability of the cursor can be improved. If the cursor is re-displayed, the display controller 351 changes a display mode such that the cursor flashes for a predetermined time or a color of the cursor is changed, in order to show the moved position.

In this way, the display controller 351 of the embodiment changes the display destination of the cursor to the title bar 611, 612, or 613 or the control bar 621, 622, or 623, based on a divided area to which the cursor is moved among divided areas that are obtained by dividing the area 630 that is displayed stereoscopically.

Figure 7:
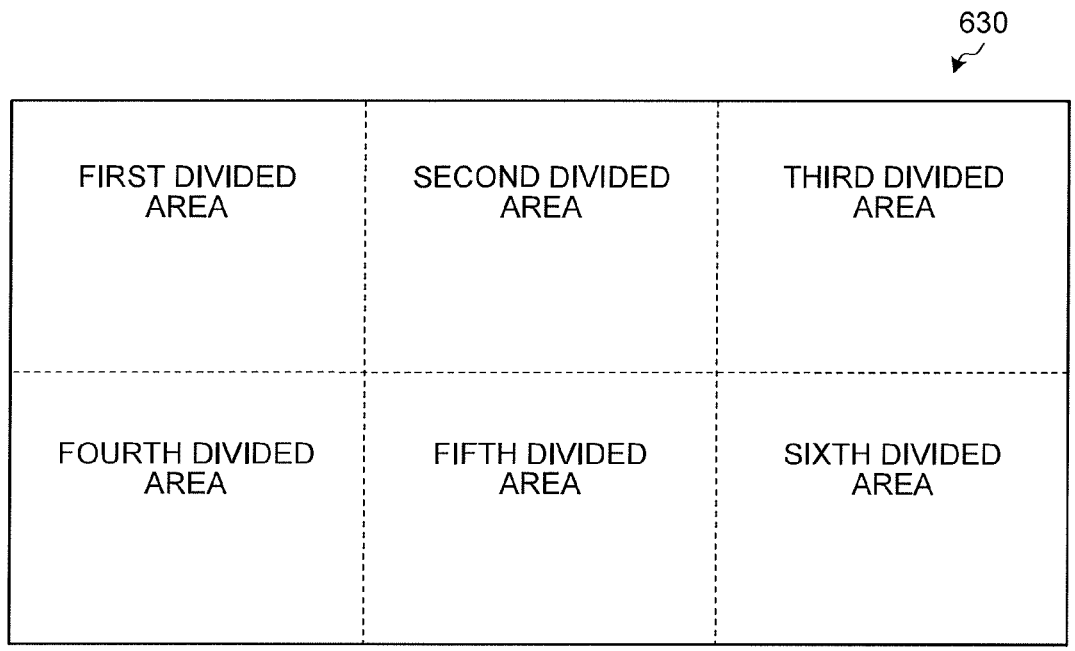
FIG. 7 is an exemplary diagram illustrating divided areas that are obtained by dividing an area where the stereoscopic display is performed.

FIG. 7 is a diagram illustrating an example of the divided areas obtained by dividing the area 630. As illustrated in FIG. 7, in the embodiment, the area 630 is divided into, for example, a first divided area, a second divided area, a third divided area, a fourth divided area, a fifth divided area, and a sixth divided area. Each of the divided areas is associated with a destination to which the cursor is moved.

In the embodiment, the destination of the cursor contained in the first divided is the title bar 611. The destination of the cursor contained in the second divided area is the title bar 612. The destination of the cursor contained in the third divided area is the title bar 613.

Furthermore, the destination of the cursor contained in the fourth divided area is the control bar 621. The destination of the cursor contained in the fifth divided area is the control bar 622. The destination of the cursor contained in the sixth divided area is the control bar 623.

Therefore, if the cursor moves to the area 630, the cursor is caused to jump so as to be displayed in the area associated with the position coordinate of the cursor, so that the operability of the cursor can be improved. In the embodiment, an example is explained in which the display screen is divided by six based on the total number of the title bars and the control bars. However, the number of the divided areas is not limited to six, but may be set to an appropriate number depending on embodiments.

As a modification, the cursor controller 320 may instruct the display controller to cause the cursor to automatically move so as to be displayed on a title bar or a control bar at the closest distance from the position where the cursor is stopped, without dividing the display screen. In this case, any technique for calculating the distance from the title bar or the control bar to the cursor is applicable.

Meanwhile, if the cursor is contained in the area 630 while the cursor is dragging a display object, such as a window or an icon, and if the cursor and the display object are hidden, it becomes difficult to perform movement operation. Furthermore, it is difficult to display the cursor and the display object in the area where the stereoscopic display is performed because of the above-mentioned reason.

In the embodiment, if the determination module 312 determines that the cursor is contained in the area 630 while the cursor is dragging a display object, the cursor switch 321 instructs the display controller 351 to continue displaying the cursor.

However, the display controller 351 cannot display the cursor at a correct position in the area 630 where the stereoscopic display is performed. Therefore, the display controller 351 switches the area 630 to the two-dimensional display. Thereafter, the display controller 351 continues displaying the cursor in the area 630. Any technique for the two-dimensional display of a 3D content is applicable. For example, a left-eye frame may be displayed in the area 630.

If the determination module 312 determines that the display object is contained in the area 630 while the cursor is dragging the display object, the window controller 330 instructs the display controller 351 to display only an outline of the display object. In the embodiment, an example is explained in which only the outline of the display object is displayed; however, it is possible to hide the display object.

Figure 8:
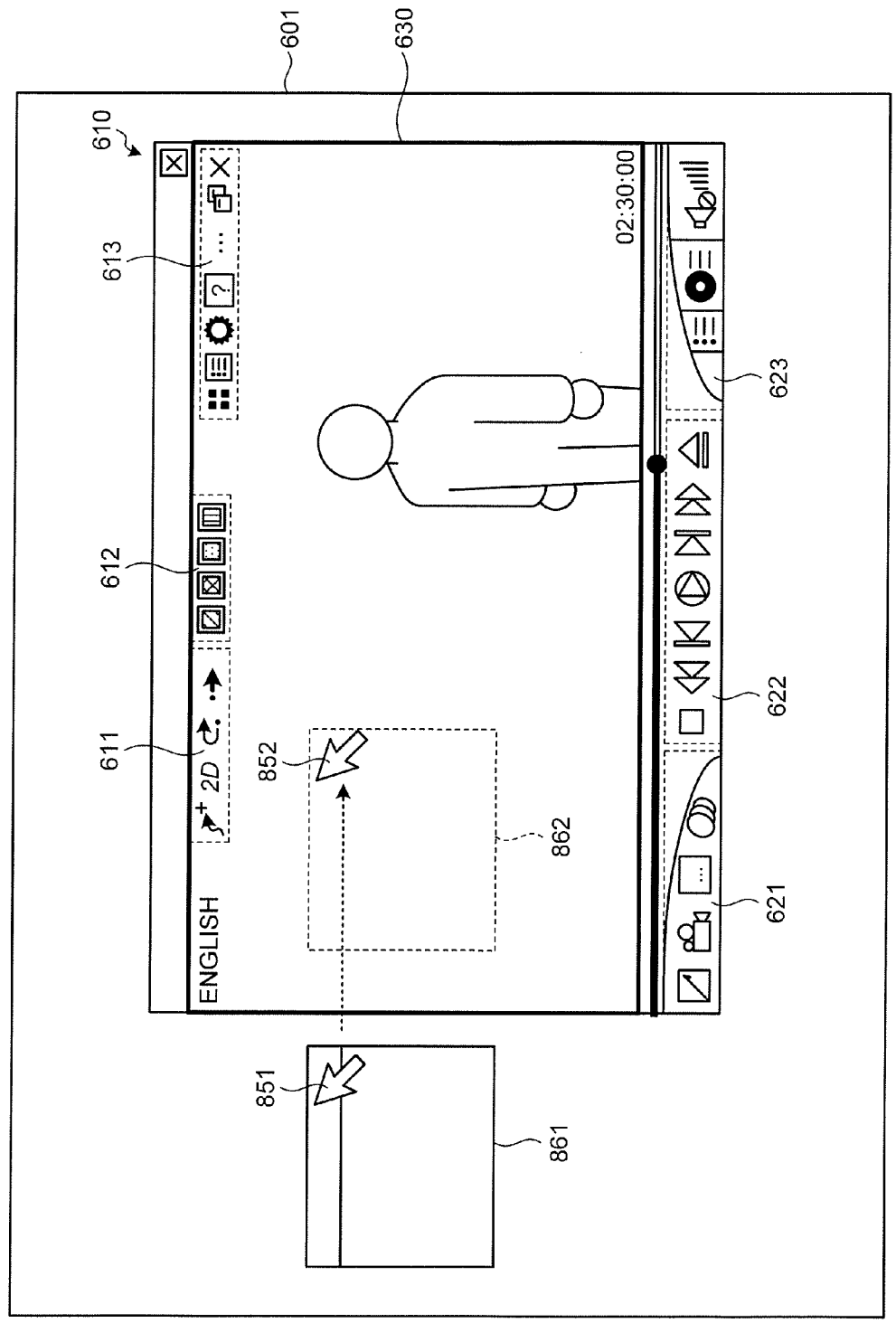
FIG. 8 is an exemplary diagram illustrating a display screen displayed by the display controller in the embodiment.

FIG. 8 is a diagram illustrating an example of a display screen displayed by the display controller 351. The display screen 601 illustrated in FIG. 8 contains the window 610 similarly to the example of FIG. 6.

If the determination module 312 determines that a cursor 851 dragging a window 861 is contained in the area 630, the cursor switch 321 instructs the display controller 351 to continue displaying the cursor. Accordingly, the display controller 351 switches the display of the content in the area 630 to the two-dimensional display and thereafter continues displaying a cursor 852. If the determination module 312 determines that the window 861 is contained in the area 630, the window controller 330 instructs the display controller 351 to display only an outline of a portion of the window 861 contained in the area 630. Accordingly, the display controller 351 displays only an outline 862 being dragged by the cursor 852.

With the display illustrated in FIG. 8, a user can recognize the position of the cursor that is moved. Furthermore, with the display of only the outline of the window being dragged, it is possible to prevent the content displayed in the area 630 from not being recognized by the user. In the embodiment, it is assumed that the display of the contents in the area 630 is switched to the two-dimensional display if the cursor dragging a display content is contained in the area 630.

Figure 9:
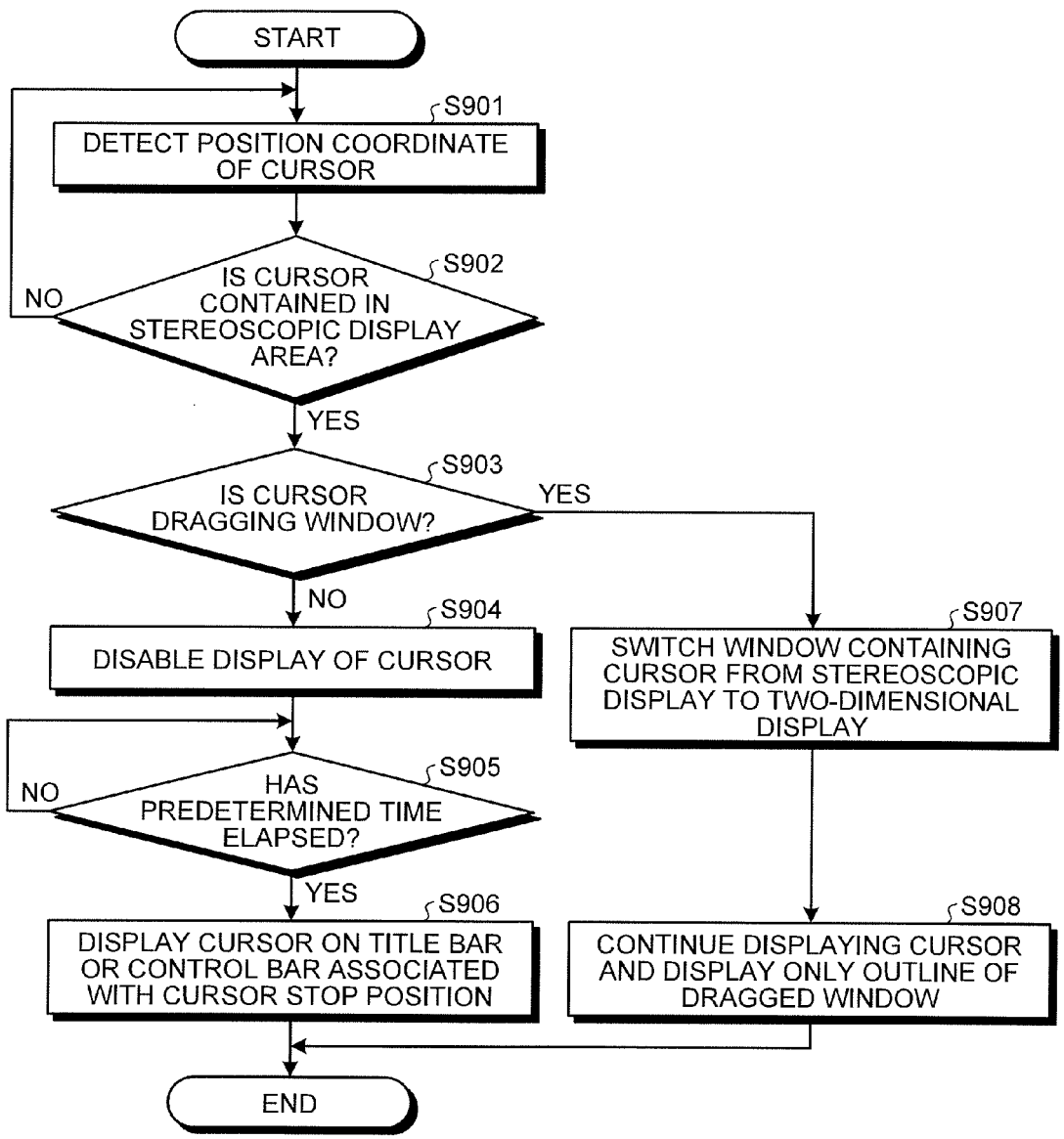
FIG. 9 is an exemplary flowchart of a procedure of a cursor control process performed by the stereoscopic image display apparatus in the embodiment.

A cursor control process performed by the stereoscopic image display apparatus 100 in the embodiment will be explained. FIG. 9 is a flowchart of a procedure of the process performed by the stereoscopic image display apparatus 100 in the embodiment.

The cursor position detector 311 detects a position coordinate of a cursor displayed on a display screen (S901).

The determination module 312 determines whether the cursor is contained in an area where the stereoscopic display is performed in a window, based on the detected position coordinate of the cursor (S902). If it is determined that the cursor is not contained in the area (No at S902), the process is repeated from S901.

On the other hand, if determining that the cursor is contained in the area where the stereoscopic display is performed (Yes at S902), the determination module 312 determines whether the cursor is dragging a window or the like (S903).

If the determination module 312 determines that the cursor is not dragging a window or the like (No at S903), the cursor switch 321 instructs the display controller 351 to hide the cursor. Accordingly, the display controller 351 hides the cursor (S904).

The cursor controller 320 determines whether a predetermined time has elapsed since movement of the hidden cursor is stopped (S905). If the predetermined time has not elapsed (No at S905), the cursor controller 320 waits for a while and determines again whether the predetermined time has elapsed (S905).

If determining that the predetermined time has elapsed (Yes at S905), the cursor controller 320 instructs the display controller 351 to display the cursor on a title bar or a control bar associated with the position where the cursor is stopped. Accordingly, the display controller 351 moves and displays the cursor on the title bar or the control bar associated with the position where the cursor is stopped (S906). In this case, the display controller 351 changes a display mode of the cursor such that the cursor flashes for a predetermined time or a color of the cursor is changed, in order to show the moved position.

On the other hand, if the determination module 312 determines that the cursor is dragging a window or the like (Yes at S903), the display controller 351 switches the display of the window containing the cursor from the stereoscopic display to the two-dimensional display (S907).

Thereafter, if the determination module 312 determines that another window being dragged by the cursor is contained in the window, the window controller 330 instructs the display controller 351 to display only an outline of the window being dragged by the cursor. Accordingly, the display controller 351 continues displaying the cursor and displays only the outline of the window being dragged by the cursor (S908).

With the process procedure described above, if a content is displayed stereoscopically in a window, and if a cursor is contained in the area where the content is displayed stereoscopically, the display controller 351 can prevent abnormality in the display.

In the embodiment, a case is explained in which the cursor is superimposed on the window displayed on the display screen; however, this is not limited thereto. The same processes are applicable even if the window is displayed as full-screen view on the display screen.

Furthermore, in the embodiment, an example is explained in which a stereoscopically-displayable content is displayed stereoscopically; however, the technique is not limited to this. For example, it is possible to perform 2D-3D conversion on a two-dimensional content to generate a stereoscopically-displayable content and thereafter perform the process configured as above.

The stereoscopic image display apparatus 100 of the embodiment hides a cursor if the cursor moves to an area where the stereoscopic display is performed, so that it is possible to prevent abnormal display of the cursor. Furthermore, it is not needed to make the cursor be compliant with the stereoscopic display, so that process load can be reduced. Moreover, the cursor is re-displayed on the title bar or the control bar, so that the convenience of the operation of the cursor can be maintained.

In the stereoscopic image display apparatus 100 of the embodiment, if the hidden cursor is re-displayed, it is possible to select an optimal destination associated with the position at which the cursor is stopped. Therefore, the operability of the cursor can be improved. In the embodiment, an example is explained in which the cursor is operated by the input device 106; however, this is not limited to the cursor. For example, a mouse pointer may be used. In this way, an operation object of the input device 106 may be any object that can point out or drag a display object displayed on the display screen.

The stereoscopic cursor control program 300 and the OS 350 executed by the stereoscopic image display apparatus 100 of the embodiment are provided as being stored in a computer-readable recording medium, such as a compact disc-read only memory (CD-ROM), a flexible disk (FD), a compact disc recordable (CD-R), a digital versatile disk (DVD), as a file in an installable or executable format.

The stereoscopic cursor control program 300 and the OS 350 executed by the stereoscopic image display apparatus 100 may be stored in a computer connected via a network, such as the Internet, so that they can be downloaded therefrom via the network. Furthermore, the stereoscopic cursor control program 300 and the OS 350 executed by the stereoscopic image display apparatus 100 may be provided or distributed via a network, such as the Internet.

The stereoscopic cursor control program 300 and the OS 350 may also be provided as being stored in advance in a ROM or the like.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display control apparatus comprising:
    a display controller configured to control displaying of stereoscopic display data that is based on pieces of image information which have a mutual parallax and an operation object that moves in accordance with a user's operation, in a screen; and
    a switch module configured to disable displaying of the operation object if the operation object moves to an area where the stereoscopic display data is displayed in the screen;
    wherein the display controller is configured to control the displaying of the operation object in an item area in which an item is arranged after the switch module has disabled the displaying of the operation object, the item being operable by the operation object.

2. The display control apparatus of claim 1, wherein the display controller is configured to change the item area in which the operation object is displayed, based on a divided area to which the operation object moves among divided areas that are obtained by dividing the area where the stereoscopic display data is displayed.

3. The display control apparatus of claim 1, wherein if the operation object is dragging a display object, and if the operation object moves to the area where the stereoscopic display data is displayed, the switch module is configured to continue displaying the operation object.

4. The display control apparatus of claim 3, wherein if the display object is contained in the area where the stereoscopic display data is displayed, the display controller is configured to disable display of the display object or display only an outline of the display object.

5. A display control method comprising:
    controlling, by a display controller, displaying of stereoscopic display data that is based on pieces of image information which have a mutual parallax and an operation object that moves in accordance with a user's operation, in a screen;
    disabling, by a switch module, displaying of the operation object if the operation object moves to an area where the stereoscopic display data is displayed in the screen; and
    controlling, by the display controller, the displaying of the operation object in an item area in which an item is arranged after the switch module has disabled the displaying of the operation object, the item being operable by the operation object.

6. A computer program product having a non-transitory computer readable medium including programmed, instructions stored on a non-transitory computer-readable medium, wherein the instructions, when executed by a computer, cause the computer to perform:
    controlling, by a display controller, displaying of stereoscopic display data that is based on pieces of image information which have a mutual parallax and an operation object that moves in accordance with a user's operation, in a screen;
    disabling, by a switch module, displaying of the operation object if the operation object moves to an area where the stereoscopic display data is displayed in the screen; and
    controlling, by the display controller, the displaying of the operation object in an item area in which an item is arranged after the switch module has disabled the displaying of the operation object, the item being operable by the operation object.

7. The computer program product of claim 6 wherein the instructions, when executed by the computer, further cause the computer to perform changing the item area in which the operation object is displayed, based on a divided area to which the operation object moves among divided areas that are obtained by dividing the area where the stereoscopic display data is displayed.

8. The display control method of claim 5, further comprising changing the item area in which the operation object is displayed, based on a divided area to which the operation object moves among divided areas that are obtained by dividing the area where the stereoscopic display data is displayed.

* * * * *